(12) United States Patent
Jaehnigen et al.

(10) Patent No.: US 11,945,904 B2
(45) Date of Patent: Apr. 2, 2024

(54) FLEXIBLE POLYURETHANE FOAMS

(71) Applicant: BASF SE, Ludwigshafen am Rhein (DE)

(72) Inventors: Julia Jaehnigen, Lemfoerde (DE); Wibke Loelsberg, Ludwigshafen (DE); Angelika Mueller, Lemfoerde (DE); Daniela Tepe, Lemfoerde (DE); Frank Prissok, Lemfoerde (DE); Dejan Petrovic, Lemfoerde (DE); Heinz-Dieter Lutter, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 955 days.

(21) Appl. No.: 16/955,962

(22) PCT Filed: Dec. 20, 2018

(86) PCT No.: PCT/EP2018/086186
§ 371 (c)(1),
(2) Date: Jun. 19, 2020

(87) PCT Pub. No.: WO2019/122122
PCT Pub. Date: Jun. 27, 2019

(65) Prior Publication Data
US 2020/0339735 A1 Oct. 29, 2020

(30) Foreign Application Priority Data
Dec. 20, 2017 (EP) .................................... 17208739

(51) Int. Cl.
| | | |
|---|---|---|
| A43B 1/14 | (2006.01) |
| A43B 7/1425 | (2022.01) |
| A43B 7/144 | (2022.01) |
| A43B 7/149 | (2022.01) |
| A43B 13/04 | (2006.01) |
| A43B 13/18 | (2006.01) |
| A43B 23/02 | (2006.01) |
| A43B 23/26 | (2006.01) |
| C08G 18/12 | (2006.01) |
| C08G 18/18 | (2006.01) |
| C08G 18/32 | (2006.01) |
| C08G 18/42 | (2006.01) |
| C08G 18/48 | (2006.01) |
| C08G 18/66 | (2006.01) |
| C08G 18/76 | (2006.01) |
| C08G 18/79 | (2006.01) |
| C08J 9/12 | (2006.01) |
| C08J 11/04 | (2006.01) |
| C08L 75/08 | (2006.01) |
| B29D 35/12 | (2010.01) |
| B29K 75/00 | (2006.01) |
| B29K 105/04 | (2006.01) |

(52) U.S. Cl.
CPC .............. *C08G 18/797* (2013.01); *A43B 1/14* (2013.01); *A43B 7/1425* (2013.01); *A43B 7/144* (2013.01); *A43B 7/149* (2013.01); *A43B 13/04* (2013.01); *A43B 13/187* (2013.01); *A43B 23/0215* (2013.01); *A43B 23/26* (2013.01); *C08G 18/12* (2013.01); *C08G 18/1816* (2013.01); *C08G 18/3206* (2013.01); *C08G 18/3275* (2013.01); *C08G 18/4238* (2013.01); *C08G 18/4825* (2013.01); *C08G 18/485* (2013.01); *C08G 18/664* (2013.01); *C08G 18/6674* (2013.01); *C08G 18/6688* (2013.01); *C08G 18/7671* (2013.01); *C08J 9/125* (2013.01); *C08J 11/04* (2013.01); *C08L 75/08* (2013.01); *B29D 35/122* (2013.01); *B29D 35/126* (2013.01); *B29K 2075/00* (2013.01); *B29K 2105/04* (2013.01); *C08G 2110/0008* (2021.01); *C08G 2110/0083* (2021.01); *C08J 2375/04* (2013.01)

(58) Field of Classification Search
USPC ........................................................... 521/49
See application file for complete search history.

(56) References Cited

U.S. PATENT DOCUMENTS

| | | |
|---|---|---|
| 3,304,273 A | 2/1967 | Stamberger |
| 3,383,351 A | 5/1968 | Stamberger |
| 3,523,093 A | 8/1970 | Stamberger |
| 3,935,132 A | 1/1976 | Gerkin et al. |
| 4,904,706 A | 2/1990 | Uenishi et al. |
| 2010/0047550 A1 | 2/2010 | Prissok et al. |
| 2015/0252163 A1 | 9/2015 | Prissok et al. |
| 2016/0108198 A1 | 4/2016 | Watkins et al. |

(Continued)

FOREIGN PATENT DOCUMENTS

| | | |
|---|---|---|
| DE | 1 152 536 A | 8/1963 |
| DE | 1 152 537 A | 8/1963 |
| DE | 195 14 744 C2 | 3/1999 |

(Continued)

OTHER PUBLICATIONS

WO-2008087078-A Machine Translation (Year: 2008).*
WO-2013107717-A1 Machine Translation (Year: 2013).*
International Search Report dated Mar. 4, 2019 in PCT/EP2018/086186, 2 pages.
International Preliminary Report on Patentability dated Jun. 25, 2020 in PCT/EP2018/086186 filed Dec. 20, 2018, 8 pages.

(Continued)

*Primary Examiner* — Terressa Boykin
(74) *Attorney, Agent, or Firm* — Grüneberg and Myers PLLC

(57) ABSTRACT

The present invention relates to a process for producing a flexible polyurethane foam thermally recyclable by fusion, and to hybrid materials made of flexible polyurethane foam and compact thermoplastic elastomer and/or expanded thermoplastic polyurethane.

20 Claims, No Drawings

(56) References Cited

U.S. PATENT DOCUMENTS

2016/0271847 A1    9/2016    Watkins et al.
2017/0036377 A1    2/2017    Baghdadi et al.

FOREIGN PATENT DOCUMENTS

| | | | |
|---|---|---|---|
| DE | 199 16 543 B4 | 2/2008 | |
| WO | WO 2005/023920 A1 | 3/2005 | |
| WO | WO 2007/082838 A1 | 7/2007 | |
| WO | WO-2008087078 A * | 1/2008 | ............ C08G 18/10 |
| WO | WO 2008/087078 A1 | 7/2008 | |
| WO | WO 2010/136398 A1 | 12/2010 | |
| WO | WO 2012/065291 A1 | 5/2012 | |
| WO | WO 2013/107717 A1 | 7/2013 | |
| WO | WO-2013107717 A1 * | 7/2013 | ............ C08G 18/10 |
| WO | WO 2013/153190 A1 | 10/2013 | |
| WO | WO 2014/150119 A1 | 9/2014 | |
| WO | WO 2014/150124 A1 | 9/2014 | |
| WO | WO 2014/198779 A1 | 12/2014 | |
| WO | WO 2015/055811 A1 | 4/2015 | |
| WO | WO 2016/131671 A1 | 8/2016 | |
| WO | WO 2017/030835 A1 | 2/2017 | |

OTHER PUBLICATIONS

"Kunststoffhandbuch, Band 7, Polyurethane" Carl Hanser Verlag, 3. Auflage, Kapitel 3.1, 1993, 19 pages.

"Kunststof-Handbuch, Band 7, Polyurethane" Carl Hanser Verlag, München, 1996 (S. 103-113), 27 pages.

"Kunststoff-Handbuch, Band 7, Polyurethane" Herausgegeben von Günter Oertel, Carl-Hanser-Verlag, München, 3. Auflage, Kapitel 5, 1993, 74 pages.

Wayne Richard Sorenson, et al., "Preparative Methods of Polymer Chemistry" Interscience Publishers, Inc., New York, 1961, (S.111-127), 21 pages.

"Kunststoff-handbuch, Band VIII" Carl Hanser Verlag, München, 1973 (reference unavailable).

James G. Smith, et al., "Preparation and Properties of Poly (Methylene Terephthalates)" Journal of Polymer Science, Part A1, vol. 4, 1966, pp. 1851-1859. Plastics Additives Handbook, 5th Edition, H. Zweifel, ed., Hanser Publishers, München, 2001([1]), S.98-S136.

* cited by examiner

FLEXIBLE POLYURETHANE FOAMS

The present invention relates to a process for producing a flexible polyurethane foam thermally recyclable by fusion, having a free density between 30 and 150 g/L, by conversion of a reaction mixture comprising
  a. an isocyanate component having a functionality between 1.9-2.2;
  b. a polyol component having a functionality between 1.7-2.2;
  c. at least one blowing agent; and
  d. a catalyst;
and to the flexible polyurethane foams produced by the process of the invention and to hybrid materials comprising the flexible polyurethane foam of the invention and compact thermoplastic elastomer and/or expanded thermoplastic polyurethane.

Flexible polyurethane foams have various industrial uses, including as cushioning in automobile interiors, seats, carpets and engine hoods, in furniture, armchairs, chairs, armrests, sofas, beds, shoes, boots, ski boots, sports equipment, grips, bicycle grips or saddles, and wound dressings and plasters, sponge, or for filter materials. In some of these applications, flexible polyurethane foams are often used in conjunction with other polymers such as thermoplastic elastomers.

In the footwear industry, for example, outer soles, upper materials and decorative elements, for example, are produced from a thermoplastic material, which comprise cushioning elements made of flexible foam, for example in the heel/forefoot region and in the footwear tongue. In addition, hybrid materials made of flexible polyurethane foams and other thermoplastic materials find uses in furniture (chairs, seats, seat cushions) or else in the medical sector, such as plasters.

The resulting wastes both of flexible polyurethane foams and of wastes that comprise flexible polyurethane foams as well as the thermoplastic materials are problematic for various reasons in terms of environmentally proper disposal.

Firstly, the currently standard flexible polyurethane foams that have corresponding free densities are chemically crosslinked and hence not amenable to a thermoplastic processing method as thermal recycling method by fusion. Wastes that comprise flexible polyurethane foams as well as the thermoplastic materials are not 100% thermoplastic as a result. This limits further applications since 100% thermoplastic materials obtained after recycling are a valuable starting raw material for applications such as, for example, for use in consumer articles, preferably selected from the group consisting of items of apparel, especially footwear and footwear parts, especially outer sole and laces; jewelry and jewelry part, especially for a smart device or monitoring electronics (especially for monitoring of body functions such as heartbeat, temperature), preferably selected from the group consisting of wristband, wristband part, pendant and pendant part, bodybelt and bodybelt part, glasses and glasses part; item of sports equipment, especially sports wristband, expansion wristband; damping material; foam particles; woven article; nonwoven article; cleaning articles for mobile driving or flying devices, especially windshield wipers; medical articles, especially dressing articles or hose. A smart device in this context is an electronic device which is wirelessly networked or networkable to another device or network, for example devices for consumer electronics, phones, smartwatches.

Thus, there are various disclosures concerned with recycling of crosslinked flexible polyurethane foams, for example DE 19916543B4, U.S. Pat. No. 3,935,132, WO 2012/065291 A1.

Secondly, for many of the aforementioned applications, there is a need to produce a flexible polyurethane foam with minimum free density, i.e. a low weight as well and hence advantageously low weight with retention of the elastic properties, but in particular of cushioning, comfortable, soft properties. Since the great majority of the flexible polyurethane foams is produced with polyol components of functionality between 2 and 8 (see, for example, U.S. Pat. No. 4,904,706), the flexible polyurethane foams disclosed experimentally therein are crosslinked and hence not thermally fusible; merely softening of the surface is possible with the first breakdown reactions.

For example, DE 19514744 C2 describes a process in which, after mechanical comminution of the flexible foam and of a layer of fabric or leather at low temperatures, wherein the subsequent bonding is achieved by addition of a fusible polyamide or polyester powder, wherein thermal breakdown of the raw material is explicitly desired.

It is thus an object of the present invention to find suitable flexible polyurethane foams and hybrid materials which, after utilization or use or at the end of lifetime, can be processed thermoplastically (extrusion, injection molding) in order to obtain a starting material/pelletized material of value for applications, for example for injection-molded or extruded products. The recycled hybrid material is preferably suitable for injection molding applications such as underlays, dampers, stops, footwear soles, footwear parts, rail pads, mats, animal earmarks.

The object is achieved by a process for producing a flexible polyurethane foam thermally recyclable by fusion, having a free density between 30 and 150 g/L, the conversion of a reaction mixture comprising
  a. an isocyanate component having a functionality between 1.9-2.2;
  b. a polyol component having a functionality between 1.7-2.2;
  c. at least one blowing agent; and
  d. a catalyst.

The abovementioned process is provided by the present invention.

The isocyanate component (a) comprises at least one polyisocyanate. According to the invention, the polyisocyanate composition may also comprise two or more polyisocyanates. Isocyanate components (a) used with preference are aliphatic, cycloaliphatic, araliphatic and/or aromatic isocyanates, more preferably tri-, tetra-, penta-, hexa-, hepta- and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4-bis(isocyanatomethyl)cyclohexane and/or 1,3-bis(isocyanatomethyl) cyclohexane (HXDI), paraphenylene 2,4-diisocyanate (PPDI), tetramethylenexylene 2,4-diisocyanate (TMXDI), dicyclohexylmethane 4,4'-, 2,4'- and 2,2'-diisocyanate (H12 MDI), hexamethylene 1,6-diisocyanate (HDI), cyclohexane 1,4-diisocyanate, 1-methylcyclohexane 2,4- and/or 2,6-diisocyanate, diphenylmethane 2,2'-, 2,4'- and/or 4,4'-diisocyanate (MDI), naphthylene 1,5-diisocyanate (NDI), tolylene 2,4- and/or 2,6-diisocyanate (TDI), diphenylmethane diisocyanate, dimethyldiphenyl 3,3'-diisocyanate, diphenylethane 1,2-diisocyanate and/or phenylene diisocyanate or prepolymers of these isocyanates and polyols or isocyanates and isocyanate-reactive components.

Particular preference is given to diphenylmethane 2,2'-, 2,4'- and/or 4,4'-diisocyanate (MDI), the mixtures of monomeric diphenylmethane diisocyanates and higher polycyclic homologs of diphenylmethane diisocyanate (polymer MDI). The isocyanate component (a) used to produce the polyurethane foams of the invention has an isocyanate content of 20% to 33.5% by weight, preferably 25% to 31.5% by weight.

In a preferred embodiment, the process for producing a flexible polyurethane foam having a free density between 30 and 150 g/L comprises the conversion of a reaction mixture comprising that (i) mixing an isocyanate component (a) and optionally a portion of the polyol component (b) and converting them to an isocyanate-terminated prepolymer, and (ii) mixing the isocyanate-terminated prepolymer obtained in (i) with the polyol component (b) or any remaining portion of the polyol component (b), and blowing agent (c), and any catalysts (d) present and other auxiliaries and/or additives, and reacting them to give the flexible polyurethane foam, optionally in a mold.

An isocyanate-terminated prepolymer is obtainable in i) by converting above-described isocyanate component (a), preferably in excess by comparison to polyols used in (i), preferably at temperatures of 30 to 150° C., further preferably at temperatures of 50 to 120° C., further preferably at about 80° C., to the prepolymer. Preference is given to preparing the isocyanate-terminated prepolymer using polyisocyanates and polyols having a functionality between 1.7-2.2 based on polyesters and polyethers.

Optionally, customary chain extenders having a functionality between 1.7-2.2 are added to the polyols mentioned in the preparation of the isocyanate-terminated prepolymer. Substances of this kind are known in principle from the prior art or are described below. Chain extenders used with particular preference are butane-1,4-diol, dipropylene glycol and/or tripropylene glycol. Preferably, the ratio of polyisocyanates to polyols and optionally chain extenders is chosen such that the isocyanate-terminated prepolymer has an NCO content of 2% to 30.5%, preferably 10% to 30%, further preferably of 12% to 29%, and most preferably an NCO content of 15% to 28%.

According to the invention, a polyol component (b) is also used. This polyol component (b) in (ii) comprises at least one polyester- or polyetherpolyol, especially at least one polyester- or polyetherpolyol having a functionality between 1.7 and 2.2 in each case, and it is also possible in accordance with the invention to use two or more polyester- or polyetherpolyols or mixtures of polyester- and polyetherpolyols. A "polyester- or polyetherpolyol having a functionality of xx" is understood to mean a nominally xx-functional polyester- or polyetherpolyol. In practice, there is a deviation from the nominal functionalities since various side reactions during the polyol synthesis can lead to a functionality that can actually be lower than nominally assumed. Polyols are fundamentally known to those skilled in the art and described for example in "Kunststoffhandbuch, Band 7, Polyurethane" [Plastics Handbook, volume 7, Polyurethanes], Carl Hanser Verlag, 3rd edition 1993, chapter 3.1.

As set out above, a polyol component (b) having a functionality between 1.9-2.2 is used, and it is also possible here to use mixtures of polyols. If polyols having a higher functionality as set out below are used in these polyol mixtures, the functionality of the mixture must preferably not be more than 2.2. In addition, the proportion of polyols having a higher functionality must not be more than 10% by weight, preferably not more than 5% by weight, based on the overall mixture. Polyesterpolyols may be prepared, for example, from organic dicarboxylic acids having 2 to 12 carbon atoms, preferably aliphatic dicarboxylic acids having 4 to 6 carbon atoms, and polyhydric alcohols, preferably diols, having 2 to 12 carbon atoms, preferably 2 to 6 carbon atoms. Examples of useful dicarboxylic acids include: succinic acid, glutaric acid, adipic acid, suberic acid, azelaic acid, sebacic acid, decanedicarboxylic acid, maleic acid, fumaric acid, phthalic acid, isophthalic acid and terephthalic acid. The dicarboxylic acids may be used either individually or in admixture with one another. Instead of the free dicarboxylic acids it is also possible to use the corresponding dicarboxylic acid derivatives, for example dicarboxylic esters of alcohols having 1 to 4 carbon atoms or dicarboxylic anhydrides. Preference is given to using dicarboxylic acid mixtures of succinic acid, glutaric acid and adipic acid in quantitative ratios of, for example, 20 to 35:35 to 50:20 to 32 parts by weight, and in particular adipic acid. Examples of mono-, di- and polyhydric alcohols, especially diols are: ethanediol, diethylene glycol, propane-1,2- and -1,3-diol, dipropylene glycol, butane-1,4-diol, pentane-1,5-diol, hexane-1,6-diol, decane-1,10-diol, glycerol and trimethylolpropane. It is preferable to use ethanediol, diethylene glycol, butane-1,4-diol, pentane-1,5-diol and hexane-1,6-diol. It is also possible to use polyesterpolyols formed from lactones, e.g. ε-caprolactone, or hydroxycarboxylic acids, e.g. ω-hydroxycaproic acid.

The polyesterpolyols can be prepared by polycondensing the organic, for example aromatic and preferably aliphatic, polycarboxylic acids and/or derivatives and polyhydric alcohols in a catalyst-free manner or preferably in the presence of esterification catalysts, appropriately in an atmosphere of inert gas, for example nitrogen, carbon monoxide, helium, argon inter alia, in the melt at temperatures of 150 to 250° C., preferably 180 to 220° C., optionally under reduced pressure, down to the desired acid number which is preferably less than 10, more preferably less than 2. In a preferred embodiment, as esterification mixture is polycondensed at the abovementioned temperatures down to an acid number of 80 to 30, preferably 40 to 30, under standard pressure, and then under a pressure of less than 500 mbar, preferably 50 to 150 mbar. Examples of useful esterification catalysts include iron catalysts, cadmium catalysts, cobalt catalysts, lead catalysts, zinc catalysts, antimony catalysts, magnesium catalysts, titanium catalysts and tin catalysts, in the form of metals, metal oxides or metal salts. However, the polycondensation can also be conducted in the liquid phase in the presence of diluents and/or entraining agents, for example benzene, toluene, xylene or chlorobenzene, for azeotropic distillative removal of the water of condensation. For preparation of the polyesterpolyols, the organic polycarboxylic acids and/or derivatives and polyhydric alcohols are advantageously polycondensed in a molar ratio of 1:1 to 1.8, preferably 1:1.05 to 1.2.

The polyesterpolyols used preferably have a functionality 1 to 4, especially of 2 to 3, and, for example, a number-average molecular weight of 480 to 3000 g/mol, preferably 1000 to 3000 g/mol.

Polyetherols are prepared by known processes, for example by anionic polymerization with alkali metal hydroxides or alkali metal alkoxides as catalysts and with addition of at least one starter molecule comprising 2 to 3 reactive hydrogen atoms in bonded form or by cationic polymerization with Lewis acids such as antimony pentachloride or boron fluoride etherate or by bases, for example potassium hydroxide, from one or more alkylene oxides having 2 to 4 carbon atoms in the alkylene radical. Suitable alkylene oxides are, for example, 1,3-propylene oxide, 1,2- and 2,3-butylene oxide and preferably ethylene oxide and 1,2-propylene oxide. In addition, tetrahydrofuran monomer may be used. Further catalysts used may also be multimetal cyanide compounds, called DMC catalysts. The alkylene oxides may be used individually, in alternating succession, or in the form of mixtures. Preference is given to 1,2-propylene oxide, ethylene oxide and mixtures of 1,2-propylene oxide and ethylene oxide, where the ethylene oxide is used in amounts of 1% to 50% and further preferably as an ethylene oxide end block ("EO-cap"), so that the polyols formed have primary OH end groups to an extent of more than 70%.

In a particularly preferred embodiment, mixtures of starter molecules are used, such that the average number of reactive hydrogen atoms in the starter molecules is between 2 and 6. Useful starter molecules preferably include water or di- to octahydric alcohols, such as ethylene glycol, propane-1,2- and -1,3-diol, diethylene glycol, dipropylene glycol, butane-1,4-diol, glycerol or trimethylolpropane, pentaerythritol, sugar alcohols such as sorbitol or sugars such as sucrose, aminic compounds, for example ethylenediamine, diethanolamine or toluenediamine, or mixtures of the starter molecules.

The particularly preferred polyether polyols, preferably polyoxypropylene-polyoxyethylenepolyols or polyoxypropylenepolyols, preferably have a functionality of 1.3 to 5.8, more preferably a functionality of 1.5 to 5 and most preferably a functionality of 1.7 to 2.2, and number-average molecular weights of 1000 g/mol to 12 000 g/mol (or an OH number of 7 to 325 mg KOH/g), preferably of 1500 g/mol to 8000 g/mol (or an OH number of 12 to 190 mg KOH/g), especially 2000 g/mol to 6000 g/mol (or an OH number of 17 to 125 mg KOH/g).

In some cases, polymer polyol dispersions (also called "graft polyols") are also used. Suitable polyols for the polyol composition in (ii) further include polymer-modified polyols, preferably polymer-modified polyesterols or polyetherols, particularly preferably graft polyetherols and graft polyesterols, in particular graft polyetherols.

In this context, what is called a polymer polyol is one that typically has a content of preferably thermoplastic polymers of 5% to 60% by weight, preferably 10% to 55% by weight, more preferably 30% to 55% by weight and especially 40% to 50% by weight. These polymer polyesterols are described in WO 05/098763 and EP-A-250 351 for example and are typically prepared by free-radical polymerization of suitable olefinic monomers, for example styrene, acrylonitrile, (meth)acrylates, (meth)acrylic acid and/or acrylamide, in a polyesterol which serves as a graft base. The side chains are generally formed by transfer of the free radicals from growing polymer chains onto polyesterols or polyetherols. In addition to the graft copolymer the polymer polyol predominantly comprises the homopolymers of the olefins, dispersed in unchanged polyesterol/polyetherol.

In a preferred embodiment, monomers used are acrylonitrile, styrene, preferably acrylonitrile and styrene. The monomers are optionally polymerized in the presence of further monomers, a macromer, i.e. an unsaturated, free-radically polymerizable polyol, or a moderator and with use of a free-radical initiator, usually azo compounds or peroxide compounds, in a polyesterol or polyetherol as continuous phase. This process is described in U.S. Pat. Nos. 3,304,273 A, 3,383,351 A, 3,523,093 A, DE 1 152 536 A and DE 1 152 537 for example. The macromers are also incorporated into the copolymer chain during the free-radical polymerization. This results in the formation of block copolymers having a polyester/polyether block and a poly(acrylonitrile-styrene) block, which act as compatibilizers at the interface between the continuous phase and the disperse phase and suppress the agglomeration of the polymer polyesterol particles. The proportion of macromers is typically 1% to 20% by weight based on the total weight of the monomers used for preparing the polymer polyol. If polymer polyol is present in the graft polyol, it is preferably present together with further polyols, for example polyetherols, polyesterols or mixtures of polyetherols and polyesterols. More preferably, the proportion of polymer polyol is greater than 5% by weight, based on the total weight of component (ii). The polymer polyols may be present, for example, in an amount of 7% to 90% by weight or of 11% to 80% by weight based on the total weight of component (ii). More preferably, the polymer polyol is polymer polyesterol or polymer polyetherol. Preferably, polyol composition b) used comprises mixtures comprising polyetherols. The proportion of polyetherols in the polyol composition (b) is preferably at least 30% by weight, more preferably at least 70% by weight, and the polyol composition (b) used is especially exclusively polyetherol.

Preferably, the polyol component (b) comprises at least one polyester- or polyetherpolyol. The number-average molecular weight Mn of the polyols used in accordance with the invention in the polyol composition (b) is preferably between 480 g/mol and 12 000 g/mol, preferably between 800 g/mol and 8000 g/mol, especially between 1000 g/mol and 6000 g/mol.

Especially preferred are polyesterdiols, preferably polycaprolactone, and/or polyetherpolyols, preferably polyetherdiols, more preferably those based on ethylene oxide, propylene oxide and/or butylene oxide, preferably polypropylene glycol. A particularly preferred polyether is polytetrahydrofuran (PTHF), in particular polyetherols.

Polyols chosen are more preferably those from the following group: copolyesters based on adipic acid, succinic acid, pentanedioic acid, sebacic acid or mixtures thereof and mixtures of ethane-1,2-diol and butane-1,4-diol, copolyesters based on adipic acid, succinic acid, pentanedioic acid, sebacic acid or mixtures thereof and mixtures of butane-1,4-diol and hexane-1,6-diol, polyesters based on adipic acid and 3-methylpentane-1,5-diol and/or polytetramethylene glycol (polytetrahydrofuran, PTHF), more preferably copolyesters based on adipic acid and mixtures of ethane-1,2-diol and butane-1,4-diol or polyesters based on adipic acid, succinic acid, pentanedioic acid, sebacic acid or mixtures thereof and polytetramethylene glycol (PTHF) or mixtures thereof.

In addition, the polyol component (b) may comprise a chain extender or a chain extender composition. Chain extenders used are preferably aliphatic, araliphatic, aromatic and/or cycloaliphatic compounds having a molecular weight of 50 g/mol to 499 g/mol, preferably having 2 isocyanate-reactive bonds which are also referred to as functional groups. Preferred chain extenders are diamines and/or alkanediols, further preferably alkanediols having 2 to 10 carbon atoms, preferably having 3 to 8 carbon atoms in the alkylene radical, which further preferably have solely primary hydroxyl groups.

In preferred embodiments, chain extenders are used; these are preferably aliphatic, araliphatic, aromatic and/or cycloaliphatic compounds having a molecular weight of 50 g/mol to 499 g/mol, preferably having 2 isocyanate-reactive groups which are also referred to as functional groups. The chain extender is preferably at least one chain extender selected from the group consisting of 1,2-ethylene glycol, propane-1,3-diol, decane-1,10-diol, 1,2-, 1,3-, 1,4-dihydroxycyclohexane, diethylene glycol, dipropylene glycol, tripropylene glycol, and butane-1,4-diol, hexane-1,6-diol and bis(2-hydroxyethyl)hydroquinone, and low molecular weight polyalkylene oxides that contain hydroxyl groups and are based on ethylene oxide and/or 1,2-propylene oxide and the aforementioned diols as starter molecules. In addition, chain extenders used may also be aromatic amines, for example diethyltoluenediamine, 3,3"-dichloro-4,4"-diaminodiphenylmethane, 3,5-diamino-4-chloroisobutyl benzoate, 4-methyl-2,6-bis(methylthio)-1,3-diaminobenzene, trimethylene glycol di-p-aminobenzoate, 2,4-diamino-3,5-di (methylthio)toluene. Such aromatic aminic chain extenders can be sourced from various manufacturers and are known to the person skilled in the art usually also by various abbreviations, for example MOCA, MBOCA, MCDEA, DETA. Chain extenders used with particular preference are butane-1,4-diol, dipropylene glycol and/or tripropylene glycol. Particularly suitable chain extenders are those selected from the group consisting of 1,2-ethylene glycol, propane-1,3-diol, butane-1,4-diol and hexane-1,6-diol.

Based on the total weight of component (b), the proportion of the chain extender is at least 0.2% by weight, preferably 1.0% to 5% by weight, more preferably 1.5% to 4% by weight, most preferably 2.0% to 3.5% by weight.

In addition, one or more blowing agents (c) are also present in the production of the flexible polyurethane foams of the invention. Blowing agents (c) used may be chemically active blowing agents and/or physically active compounds. Chemical blowing agents are understood to mean compounds that form gaseous products by reaction with isocyanate, for example water and carboxylic acids or carboxylic acid derivatives, for example hydrogencitrates, hydrogencarbonates or azodicarbonamides, such as Celegoene®, Tracel®, Hydrocerol® or mixtures thereof, water being a preferred blowing agent.

Physical blowing agents are understood to mean compounds that are dissolved or emulsified in the feedstocks for polyurethane production and evaporate under the conditions of polyurethane formation. These are, for example, hydrocarbons, halogenated hydrocarbons, and other compounds, for example perfluorinated alkanes, such as perfluorohexane, hydrochlorofluorocarbons, and ethers, esters, ketones and/or acetals, for example (cyclo)aliphatic hydrocarbons having 4 to 8 carbon atoms, hydrofluorocarbons, such as Solkane® 365 mfc, or gases, such as carbon dioxide, or mixtures thereof. In a preferred embodiment, the blowing agent used is a mixture of these blowing agents comprising water, more preferably exclusively water.

In a preferred embodiment, the water content is from 0.1% to 6% by weight, preferably 1% to 5% by weight, more preferably 2.5% to 4% by weight, based on the total weight of the flexible polyurethane foam.

The content of physical blowing agents (c), if present, in a preferred embodiment, is in the range between 1% and 20% by weight, especially 5% and 20% by weight, the amount of water is preferably in the range between 0.1% and 2.0% by weight, more preferably between 0.3% and 1.0% by weight and especially between 0.5% and 0.8% by weight, based in each case on the total weight of the components used in the reaction.

According to the invention, it is likewise possible that encapsulated, physical blowing agents are used, for example blowing agent-laden polystyrene or styrene-acrylonitrile polymers (SAN). Preference is given to using, for example, blowing agent-filled hollow polymer bodies. Suitable blowing agent-filled hollow polymer bodies are preferably based on a polymer having a lower polarity than the thermoplastic polyurethane used. They are preferably based on polystyrene or styrene-acrylonitrile polymers (SAN). For example, blowing agents used are filled hollow polymer bodies, called expandable microspheres. Expandable microspheres are hollow microspheres that consist of a thin plastic shell, preferably of polyacrylonitrile or copolymers thereof. These hollow microspheres have been filled with gas or low-boiling liquids, preferably with hydrocarbons. The effect of the temperature in the thermoplastic processing is softening of the polymer shell and simultaneous expansion of the gas enclosed. This results in expansion of the microspheres. The expansion capacity of the microspheres can be described via the determination of the TMA density [kg/m$^3$] (Stare Thermal Analysis System from Mettler Toledo; heating rate 20° C./min). The TMA density here is the minimum achievable density at a particular temperature $T_{max}$ under standard pressure before the microspheres collapse. The blowing agent-filled hollow polymer bodies preferably have a diameter between 20 µm and 40 µm. Blowing agent-filled hollow polymer bodies of this kind are available, for example, from Akzo Nobel, Casco Products GmbH, Essen, under the Expancel® brand. The use of blowing agent-filled hollow polymer bodies having a TMA density of less than 10 kg/m$^3$, preferably of 2-10 kg/m$^3$ and especially of 2-7 kg/m$^3$, in powder form or masterbatch form results in observation of a particularly fine cell structure, suppression of void formation and no formation of sinkmarks, and, moreover, the processing range, for example with regard to temperature, is much larger, and so particular preference is given to microspheres having such a TMA density. For example, suitable blowing agent-filled hollow polymer bodies have a bimodal particle size distribution. The particle sizes are chosen here such that optimized space filling of the expanded particles is possible and hence a minimum density of the resultant foam is obtained.

The content of blowing agent-filled hollow polymer bodies used in the mixture depends on the desired density of the flexible polyurethane foam. Preferably, for every 100 parts by weight of the polyurethane to be foamed, between 1 part by weight and 20 parts by weight, preferably between 2 parts by weight and 10 parts by weight, of the blowing agent-filled hollow polymer bodies are used.

In the context of the present invention, it is also possible to use mixtures of different blowing agents, especially mixtures comprising at least one encapsulated blowing agent and at least one chemical blowing agent or mixtures comprising at least one encapsulated blowing agent and at least one physical blowing agent.

Catalysts (d) used for production of the flexible polyurethane foams of the invention are preferably compounds that significantly accelerate the reaction of the compounds comprising hydroxyl groups of component (b) with the polyisocyanates (a) and/or the reaction of the isocyanates with water.

Suitable catalysts are, for example, amines selected from the group consisting of tertiary amines, preferably selected from the group consisting of tributylamine, triethanolamine, triisopropanolamine, N-methyldiethanolamine, N-ethyl-diethanolamine, N,N-dimethylethanolamine, N-methylmorpholine, N-ethylmorpholine, N,N,N',N'-tetramethylethylenediamine, pentamethyldiethylenetriamine; 1,4-diazabicyclo[2.2.2]octane, N-methyl-N'-dimethylaminoethylpiperazine, bis(dimethylaminoalkyl) piperazine, N,N-dimethylbenzylamine, N,N-dimethylcyclohexylamine, N,N-diethylbenzylamine, bis(N, N-diethylaminoethyl) adipate, N,N,N',N'-tetramethylbutane-1,3-diamine, N,N-dimethyl-beta-phenylethylamine, bis(dimethylaminopropyl)urea, 1,2-dimethylimidazole, 2-methylimidazole, monocyclic and bicyclic amidines, bis(dialkylamino)alkyl ethers; secondary amines, especially dimethylamine; and mixtures of two or more of these amines. Organic metal compounds are likewise useful. Preference is given to using organic metal compounds based on tin, zinc, bismuth, titanium, zirconium, manganese, iron, cobalt, copper, aluminum. Useful examples include organic tin compounds, such as tin(II) salts of organic carboxylic acids, e.g. tin(II) acetate, tin(II) octoate, tin(II) ethylhexanoate and tin(II) laurate, and the dialkyltin(IV) salts of organic carboxylic acids, e.g. dibutyltin diacetate, dibutyltin dilaurate, dibutyltin maleate and dioctyltin diacetate, and bismuth carboxylates such as bismuth(III) neodecanoate, bismuth 2-ethylhexanoate and bismuth octanoate, titanium compounds, for example titanium(IV) (triethanolaminato)isopropoxide or titanium(IV) bis(triethanolaminato)diisopropoxide or mixtures of various metal compounds. The organic metal compounds may be used either alone or in combination with strongly basic amines. In a preferred embodiment, no organic metal compounds but exclusively amines are used as catalysts. The catalysts are used typically in amounts of 0 to 2000 ppm, preferably 1 ppm to 1000 ppm, more preferably 2 ppm to 500 ppm and most preferably 5 ppm to 300 ppm.

The organic metal compounds may be used either alone or preferably in combination with strongly basic amines.

Preference is given to using exclusively amine catalysts as catalysts (d). The catalyst or catalyst combination is typically used in amounts of 0 to 2000 ppm, preferably 1 ppm to 1000 ppm, further preferably 2 ppm to 500 ppm and most preferably from 5 ppm to 300 ppm, based on the weight of component (b).

Other auxiliaries and/or additives are known per se to those skilled in the art. Suitable auxiliaries and additives can be found, for example, in the Kunststoffhandbuch [Plastics Handbook], volume 7, Carl Hanser Verlag, Munich 1966 (p. 103-113). Examples of auxiliaries and additives include surface-active substances, flame retardants, nucleating agents, oxidation stabilizers, antioxidants, lubricants and demolding aids, dyes and pigments, stabilizers, for example against hydrolysis, light, heat or discoloration, inorganic and/or organic fillers, reinforcers and plasticizers.

Auxiliaries and/or additives used are, for example, surface-active substances, foam stabilizers, cell regulators, external and internal separating agents, fillers, pigments, dyes, flame retardants, antistats, nucleating agents, oxidation stabilizers, antioxidants, lubricating and demolding aids, dyes and pigments, stabilizers, for example against hydrolysis, light, heat or discoloration, inorganic and/or organic fillers, reinforcers and plasticizers, and fungistatic and bacteriostatic substances. Further details of the starting materials used can be found, for example, in the Kunststoffhandbuch, volume 7, Polyurethane [Polyurethanes], edited by Gunter Oertel, Carl-Hanser-Verlag, Munich, third edition 1993, chapter 5, Polyurethanweichschaumstoffe [Flexible polyurethane foams].

In the production of the flexible polyurethane foams of the invention, the polyol component (b), the catalysts (d), the blowing agents (c) and any auxiliaries and/or additives used as well are mixed beforehand and reacted in this form with the polyisocyanates a).

For production of the flexible polyurethane foams of the invention, the polyisocyanate component (a) is reacted with the polyol component (b) in the presence of the said blowing agents (c), catalysts (d) and auxiliaries and/or additives. The mixing ratios chosen here are such that the equivalents ratio of NCO groups in the polyisocyanates (a) to the sum total of reactive hydrogen atoms in components (b) and, if present, (c) and (d) is in the range from 0.4:1 to 1:120, preferably 0.5 to 0.95:1.2, preferably 0.6 to 0.8:1.2 and especially 0.65 to 0.75:1.1. A ratio of 1:1 corresponds to an isocyanate index of 100.

The flexible polyurethane foams of the invention are preferably produced by the one-shot method, for example using high-pressure or low-pressure technology. The foams of the invention are produced here, for example, on a belt or preferably in a mold. The molded polyurethane foams can be produced in open or closed, for example metallic, molds.

It is particularly advantageous to proceed by what is called the two-component method, in which, as set out above, a polyol component is produced and foamed with polyisocyanate a). The components are preferably mixed at a temperature in the range between 15 to 120° C., preferably 20 to 80° C., and introduced into the mold or onto the conveyor belt. The temperature in the mold is usually in the range between 15 and 120° C., preferably between 30 and 80° C. The molded polyurethane foam thus obtained is likewise provided by the present invention.

The molded polyurethane foam has a tack-free surface, which means that workplace hygiene and user acceptance is improved, especially in the furniture and mattresses sector, but also in the case of employment in the footwear sector (wear comfort, cushioning effect when worn in the heel and forefoot region, and as footwear tongue).

The present invention provides the flexible polyurethane foams obtained via the processes set out above.

The flexible polyurethane foams of the invention are open-cell foams with low free density that are fusible under elevated pressure and appropriate temperature.

Preferably, the flexible polyurethane foams of the invention have a softening point of less than 160° C., more preferably less than 150° C., determined under a hot press at a contact pressure of 25-50 kN for 60-180 sec.

It is a further property of the flexible polyurethane foams of the invention that they can be compacted under the action of elevated pressure and appropriate temperature to give compact elastomers having surprisingly good mechanical properties.

The present invention further provides hybrid materials comprising the flexible polyurethane foam of the invention in conjunction with compact thermoplastic elastomer, preferably thermoplastic polyurethane.

The present invention further provides hybrid materials comprising the flexible polyurethane foam of the invention in conjunction with expanded thermoplastic polyurethane in the form of particles or mutually bonded particles (particle foam structure).

The present invention further provides hybrid materials comprising the flexible polyurethane foam of the invention in conjunction with expanded thermoplastic polyurethane in the form of particles or mutually bonded particles (particle foam structure), and thermoplastic elastomer, preferably polyurethane.

In this context, dimensions and the manner of distribution of the flexible polyurethane foam of the invention are determined by the nature of the application.

For example, the flexible polyurethane foam in the form of an insert or cushion element can be bonded to compact thermoplastic polyurethane.

Means of production are welding, bonding, stitching or casting.

"Compact thermoplastic elastomers" are thermoplastic elastomers having a density of at least 1 g/cm$^3$, measured without fillers, preferably a density of 1 g/cm$^3$ to 1.5 g/cm$^3$, more preferably 1.05 g/cm$^3$ to 1.35 g/cm$^3$.

The thermoplastic polyetheresters and polyesteresters may be produced by any commonly used processes known from the literature by transesterification or esterification of aromatic and aliphatic dicarboxylic acids having 4 to 20 carbon atoms or esters thereof with suitable aliphatic and aromatic diols and polyols. Such production processes are described for example in "Polymer Chemistry", Interscience Publ., New York, 1961, pages 111-127; Kunststoffhandbuch, volume VIII, C. Hanser Verlay, Munich 1973 and Journal of Polymer Science, Part A1, 4, pages 1851-1859 (1966).

Suitable aromatic dicarboxylic acids are for example phthalic acid, isophthalic acid and terephthalic acid or esters thereof. Suitable aliphatic dicarboxylic acids are for example cyclohexane-1,4-dicarboxylic acid, adipic acid, sebacic acid, azelaic acid and decanedicarboxylic acid as saturated dicarboxylic acids, and maleic acid, fumaric acid, aconitic acid, itaconic acid, tetrahydrophthalic acid and tetrahydroterephthalic acid as unsaturated dicarboxylic acids.

Suitable diol components are for example diols of general formula HO—(CH$_2$)$_n$—OH, wherein n is an integer from 2 to 20. Suitable diols are for example ethylene glycol, propane-1,3-diol, butane-1,4-diol or hexane-1,6-diol.

Polyetherols which may be transesterified to produce the thermoplastic polyetherester are preferably those of general formula HO—(CH$_2$)$_n$—O—(CH$_2$)$_m$—OH, wherein n and m may be identical or different and n and m independently of one another each represent an integer between 2 and 20.

Unsaturated diols and polyetherols which may be employed for producing the polyetherester are for example butene-1,4-diol and diols and polyetherols comprising aromatic units.

Not only the recited carboxylic acids or esters thereof and the recited alcohols but all other commonly used representatives of these compound classes may be used for providing the polyetheresters and polyesteresters employed in the process of the invention. The hard phases of the block copolymers are typically formed from aromatic dicarboxylic acids and short-chain diols and the soft phases from preformed aliphatic, difunctional polyesters having a molecular weight M$_w$ between 500 and 3000 g/mol. A coupling of the hard and soft phases may additionally be carried out using reactive coupling agents such as diisocyanates which react with terminal alcohol groups for example.

Thermoplastic polyetheramides suitable for the hybrid materials of the invention may be obtained by all commonly used processes known from the literature by reaction of amines and carboxylic acids or esters thereof. Amines and/or carboxylic acids additionally comprise ether units of the type R—O—R, wherein R is an aliphatic or aromatic organic radical. Generally employed are monomers selected from the following compound classes:

HOOC—R'—NH$_2$, wherein R' may be aromatic or aliphatic and preferably comprises ether units of the type R—O—R. R represents an aliphatic or aromatic organic radical, aromatic dicarboxylic acids, for example phthalic acid, isophthalic acid and terephthalic acid or esters thereof and also aromatic dicarboxylic acids comprising ether units of the type R—O—R, wherein R is an aliphatic or aromatic organic radical, aliphatic dicarboxylic acids, for example cyclohexane-1,4-dicarboxylic acid, adipic acid, sebacic acid, azelaic acid and decanedicarboxylic acid as saturated dicarboxylic acids and maleic acid, fumaric acid, aconitic acid, itaconic acid, tetrahydrophthalic acid and tetrahydroterephthalic acid as unsaturated dicarboxylic acids, and also aliphatic dicarboxylic acids comprising ether units of the type R—O—R, wherein R is an aliphatic and/or aromatic organic radical, diamines of general formula H$_2$N—R"—NH$_2$, wherein R" may be aromatic and aliphatic and preferably comprises ether units of the type R—O—R and R is an aliphatic and/or aromatic organic radical, lactams, for example ε-caprolactam, pyrrolidone or laurolactam, and also amino acids.

Not only the recited carboxylic acids or esters thereof and the recited amines, lactams and amino acids but also all other commonly used representatives of these compound classes may be used for providing the polyetheramine employed in the process of the invention. Also known are mixed products of polytetrahydrofuran and amide units which are likewise employable.

The thermoplastic elastomers with block copolymer structure that are usable for the hybrid materials of the invention preferably comprise vinylaromatic units, butadiene units and isoprene units, and polyolefin units and vinylic units, for example ethylene, propylene and vinyl acetate units. Preference is given to styrene-butadiene copolymers.

The thermoplastic elastomers with block copolymer structure that are usable for the hybrid materials of the invention, such as polyetheramides, polyetheresters and polyesteresters, preferably have a Shore hardness in the range from A44 to D80. Particular preference is given to Shore hardnesses in the range from A40 to A99, especially in the range from A44 to A96. The Shore hardnesses are determined according to DIN 53505.

The elastomers with block copolymer structure that are usable for the hybrid materials of the invention, such as polyetheramides, polyetheresters and polyesteresters, are chosen such that the melting points thereof are below 300° C., preferably not more than 250° C. and especially not more than 220° C.

The elastomers with block copolymer structure that are usable for the hybrid materials of the invention, such as polyetheramides, polyetheresters and polyesteresters, may be semicrystalline or amorphous.

The thermoplastic elastomers may comprise effective amounts of further additives such as dyes, pigments, fillers, flame retardants, synergists for flame retardants, antistats, stabilizers, surface-active substances, plasticizers and infrared opacifiers.

Suitable infrared opacifiers for reducing the radiative contribution to thermal conductivity are, for example, metal oxides, nonmetal oxides, metal powders, for example aluminum powders, carbon, for example carbon black, graphite or diamond, organic dyes and dye pigments. The use of infrared opacifiers is advantageous particularly for applications at high temperatures. Particularly preferred infrared opacifiers are carbon black, titanium dioxide, iron oxides or zirconium dioxide. The abovementioned materials can be used either individually or else in combination, i.e. in the form of a mixture composed of a plurality of materials. When fillers are used, these may be inorganic and/or organic.

When fillers are present, these are, for example, organic and inorganic powders or fibrous materials and mixtures thereof. Organic fillers used may, for example, be wood flour, starch, flax fibers, hemp fibers, ramie fibers, jute fibers, sisal fibers, cotton fibers, cellulose fibers or aramid fibers. Examples of suitable inorganic fillers include silicates, barytes, glass beads, zeolites, metals and metal oxides. Particular preference is given to using pulverulent inorganic substances such as chalk, kaolin, aluminum hydroxide, magnesium hydroxide, aluminum nitride, aluminum silicate, barium sulfate, calcium carbonate, calcium sulfate, silica, quartz flour, aerosil, alumina, mica or wollastonite, or inorganic substances in the form of beads or fibers, for example iron powder, glass beads, glass fibers or carbon fibers. The average particle diameters or, in the case of fibrous fillers, the length of the fibers should be in the region of the cell size or less. Preference is given to an average particle diameter or an average length of the fibers in the range from 0.1 to 100 μm, especially in the range from 1 to 50 μm. Preference is given to expandable, blowing agent-containing thermoplastic elastomers, thermoplastic elastomers having block copolymer structure, polyetheramides, polyetheresters, polyesteresters, comprising between 5% and 80% by weight of organic and/or inorganic fillers, based on the total weight of the blowing agent-containing system.

Surface-active substances that may be present in the thermoplastic molding compound are, for example, compounds that serve to assist the homogenization of the starting materials and may also be suitable for regulating the cell structure. Suitable surface-active substances are, for example, emulsifiers, for example sodium salts of castor oil sulfates or fatty acids and salts of fatty acids with amines, for example diethylammonium oleate, diethanolammonium stearate, diethanolammonium ricinoleate, salts of sulfonic acids, for example alkali metal or ammonium salts of dodecylbenzene- or dinaphthylmethanedisulfonic acid and ricinoleic acid; foam stabilizers such as siloxane-oxyalkylene copolymers and other organosiloxanes, ethoxylated alkylphenols, ethoxylated fatty alcohols, paraffin oils, castor oil esters or ricinoleic esters, turkey red oil and peanut oil, and cell regulators, for example paraffins, fatty alcohols and dimethylpolysiloxane. Also suitable for improving the emulsifying action, the cell structure and/or the stabilization thereof are oligomeric polyacrylates having polyoxyalkylene and fluoroalkane radicals as side groups. The surface-active substances are typically used in amounts of 0.01% to 5% by weight, based on the total weight of the blowing agent-containing system.

Preferred thermoplastic elastomers, the elastomers usable for the hybrid materials of the invention, are thermoplastic polyurethanes.

Thermoplastic polyurethanes are well known. They are prepared by reaction of (a) isocyanates with (b) isocyanate-reactive compounds/polyol having a number-average molecular weight of 500 g/mol to 100 000 g/mol and optionally chain extenders having a molecular weight of 50 g/mol to 499 g/mol, optionally in the presence of (c) catalysts and/or (d) customary auxiliaries and/or additives.

The components (a) isocyanate, (b) isocyanate-reactive compounds/polyol and any chain extenders are also referred to, individually or collectively, as synthesis components. The synthesis components including the catalyst and/or the customary auxiliaries and/or additives are also referred to as feedstocks.

In order to adjust the hardness and melt index of the thermoplastic polyurethanes, the amounts of synthesis components (b) used may be varied in their molar ratios, with rising hardness and melt viscosity increase as the content of chain extender in components (b) increases, while melt index decreases.

For preparation of the thermoplastic polyurethanes, the synthesis components (a) and (b), where (b) in a preferred embodiment also comprises chain extenders, are reacted in the presence of a catalyst (d) and optionally auxiliaries and/or additives in such amounts that the equivalents ratio of NCO groups of the diisocyanates (a) to the sum total of the hydroxyl groups in the polyol component (b) and (c) is 0.95 to 1.10:1, preferably 0.98 to 1.08:1 and in particular approximately 1.0 to 1.05:1.

Preference is given in accordance with the invention to preparing thermoplastic polyurethanes where the thermoplastic polyurethane has a weight-average molecular weight of at least 60 000 g/mol, preferably of at least 80 000 g/mol and especially greater than 10 000 g/mol. The upper limit for the weight-average molecular weight of the thermoplastic polyurethanes is generally determined by processibility, and also the spectrum of properties desired. The number-average molecular weight of the thermoplastic polyurethanes is preferably between 80 000 and 200 000 g/mol. The average molecular weights reported hereinabove for the thermoplastic polyurethane as well as for the synthesis components (a) and (b) are weight averages determined by gel permeation chromatography.

Organic isocyanates (a) used with preference are aliphatic, cycloaliphatic, araliphatic and/or aromatic isocyanates, more preferably tri-, tetra-, penta-, hexa-, hepta- and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4-bis(isocyanatomethyl)cyclohexane and/or 1,3-bis(isocyanatomethyl)cyclohexane (HXDI), paraphenylene 2,4-diisocyanate (PPDI), tetramethylenexylene 2,4-diisocyanate (TMXDI), dicyclohexylmethane 4,4'-, 2,4'- and 2,2'-diisocyanate (H12 MDI), hexamethylene 1,6-diisocyanate (HDI), cyclohexane 1,4-diisocyanate, 1-methylcyclohexane 2,4- and/or 2,6-diisocyanate, diphenylmethane 2,2'-, 2,4'- and/or 4,4'-diisocyanate (MDI), naphthylene 1,5-diisocyanate (NDI), tolylene 2,4- and/or 2,6-diisocyanate (TDI), diphenylmethane diisocyanate, dimethyldiphenyl 3,3'-diisocyanate, diphenylethane 1,2-diisocyanate and/or phenylene diisocyanate. Particular preference is given to using 4,4'-MDI.

Preferred isocyanate-reactive compounds (b) are those having a molecular weight between 500 g/mol and 8000 g/mol, preferably 700 g/mol to 6000 g/mol, in particular 800 g/mol to 4000 g/mol.

The isocyanate-reactive compound (b) has a statistical average of at least 1.8 and at most 2.2, preferably 2, Zerewitinoff-active hydrogen atoms, this number also being referred to as the functionality of the isocyanate-reactive compound (b) and indicating the amount of isocyanate-reactive groups in the molecule calculated theoretically for one molecule from a molar amount.

The isocyanate-reactive compound is substantially linear and is one isocyanate-reactive substance or a mixture of different substances, in which case the mixture then meets the recited requirement.

These long-chain compounds are employed in an amount of substance ratio of 1 equivalent mol % to 80 equivalent mol % based on the isocyanate group content of the polyisocyanate.

It is preferable when the isocyanate-reactive compound (b) has a reactive group selected from the hydroxyl group, the amino group, the mercapto group or the carboxylic acid group. The hydroxyl group is preferred. It is particularly preferable when the isocyanate-reactive compound (b) is selected from the group of polyesterols, polyetherols or polycarbonate diols which are also covered by the umbrella term "polyols".

Further preferred are polyesterdiols, preferably polycaprolactone, and/or polyetherpolyols, preferably polyetherdiols, more preferably those based on ethylene oxide, propylene oxide and/or butylene oxide, preferably polypropylene glycol. A particularly preferred polyether is polytetrahydrofuran (PTHF), in particular polyetherols.

It is particularly preferable to choose polyols selected from the following group comprising: copolyesters based on adipic acid, succinic acid, pentanedioic acid, sebacic acid or mixtures thereof and mixtures of ethane-1,2-diol and butane-1,4-diol, copolyesters based on adipic acid, succinic acid, pentanedioic acid, sebacic acid or mixtures thereof and mixtures of butane-1,4-diol and hexane-1,6-diol, polyesters based on adipic acid and 3-methylpentane-1,5-diol and/or polytetramethylene glycol (polytetrahydrofuran, PTHF), more preferably copolyesters based on adipic acid and mixtures of ethane-1,2-diol and butane-1,4-diol or polyesters based on adipic acid, succinic acid, pentanedioic acid, sebacic acid or mixtures thereof and polytetramethylene glycol (PTHF) or mixtures thereof.

Chain extenders used are preferably aliphatic, araliphatic, aromatic and/or cycloaliphatic compounds having a molecular weight of 50 g/mol to 499 g/mol, preferably having 2 isocyanate-reactive bonds which are also referred to as functional groups. Preferred chain extenders are diamines and/or alkanediols, further preferably alkanediols having 2 to 10 carbon atoms, preferably having 3 to 8 carbon atoms in the alkylene radical, which further preferably have solely primary hydroxyl groups.

In preferred embodiments, chain extenders (c) are used; these are preferably aliphatic, araliphatic, aromatic and/or cycloaliphatic compounds having a molecular weight of 50 g/mol to 0499 g/mol, preferably having 2 isocyanate-reactive groups which are also referred to as functional groups.

It is preferable when the chain extender is at least one chain extender selected from the group consisting of 1,2-ethylene glycol, propane-1,2-diol, propane-1,3-diol, butane-1,4-diol, butane-2,3-diol, pentane-1,5-diol, hexane-1,6-diol, diethylene glycol, dipropylene glycol, cyclohexane-1,4-diol, cyclohexane-1,4-dimethanol, neopentyl glycol and hydroquinone bis(beta-hydroxyethyl) ether (HQEE). Particularly suitable chain extenders are those selected from the group consisting of 1,2-ethylene glycol, propane-1,3-diol, butane-1,4-diol and hexane-1,6-diol.

Very particularly preferred chain extenders are butane-1,4-diol, hexane-1,6-diol and ethanediol.

In preferred embodiments catalysts (d) are employed with the synthesis components. These are in particular catalysts which accelerate the reaction between the NCO groups of the isocyanates (a) and the hydroxyl groups of the isocyanate-reactive compound (b) and, if employed, the chain extender. Preferred catalysts are tertiary amines, in particular triethylamine, dimethylcyclohexylamine, N-methylmorpholine, N, N'-di methyl piperazine, 2-(dimethylaminoethoxy) ethanol, diazabicyclo[2.2.2]octane. In another preferred embodiment the catalysts are organic metal compounds such as titanic esters, iron compounds, preferably iron(III) acetylacetonate, tin compounds, preferably those of carboxylic acids, particularly preferably tin diacetate, tin dioctoate, tin dilaurate, or tin dialkyl salts, more preferably dibutyl tin diacetate, dibutyl tin dilaurate, or bismuth salts of carboxylic acids, preferably bismuth decanoate.

Particularly preferred catalysts are tin dioctoate, bismuth decanoate and titanic esters.

The catalyst (d) is preferably employed in amounts of 0.0001 to 0.1 parts by weight per 100 parts by weight of the isocyanate-reactive compound (b).

Not only catalysts (d) but also customary auxiliaries (d) may be added to the synthesis components (a) to (b). Examples include surface-active substances, fillers, flame retardants, nucleating agents, oxidation stabilizers, lubricating and demolding aids, dyes and pigments, optionally stabilizers, preferably against hydrolysis, light, heat or discoloration, inorganic and/or organic fillers, reinforcing agents and/or plasticizers.

Stabilizers in the context of the present invention are additives which protect a plastic or a plastics mixture against damaging environmental effects. Examples include primary and secondary antioxidants, sterically hindered phenols, hindered amine light stabilizers, UV absorbers, hydrolysis stabilizers, quenchers and flame retardants. Examples of commercial stabilizers may be found in Plastics Additives Handbook, 5th Edition, H. Zweifel, ed., Hanser Publishers, Munich, 2001 ([1]), pages 98-136.

In a preferred embodiment the UV absorbers have a number-average molecular weight of more than 300 g/mol, in particular more than 390 g/mol. Furthermore, the UV absorbers used with preference should have a molecular weight of not more than 5000 g/mol, more preferably of not more than 2000 g/mol.

Particularly suitable UV absorbers are the group comprising cinnamates, oxanilides and benzotriazoles, particular preference being given to benzotriazoles. Examples of particularly suitable benzotriazoles are Tinuvin® 213, Tinuvin® 234, Tinuvin® 571 and Tinuvin® 384, and Eversorb®82.

The UV absorbers are typically metered in amounts of 0.01% by weight to 5% by weight based on the total mass of thermoplastic polyurethane, preferably 0.1% by weight to 2.0% by weight, in particular 0.2% by weight to 0.5% by weight.

An above-described UV stabilization based on an antioxidant and a UV absorber is often not yet sufficient to ensure good stability of the thermoplastic polyurethane of the invention against the damaging effect of UV radiation. In this case a hindered amine light stabilizer (HALS) may still be added to the thermoplastic polyurethane of the invention in addition to the antioxidant and the UV absorber. The activity of the HALS compounds is based on their ability to form nitroxyl radicals which interferes in the mechanism for oxidation of polymers. HALS are highly efficient UV stabilizers for most polymers.

HALS compounds are common knowledge and commercially available. Examples of commercially available HALS stabilizers may be found in Plastics Additive Handbook, 5th edition, H. Zweifel, Hanser Publishers, Munich, 2001, pages 123-136.

Preferably employed hindered amine light stabilizers are hindered amine light stabilizers having a number-average molecular weight greater than 500 g/mol. Furthermore, the molecular weight of the preferred HALS compounds should be not more than 10 000 g/mol, particularly preferably not more than 5000 g/mol.

Particularly preferred hindered amine light stabilizers are bis(1,2,2,6,6-pentamethylpiperidyl) sebacate (Tinuvin® 765, Ciba Spezialitätenchemie AG) and the condensation product of 1-hydroxyethyl-2,2,6,6-tetramethyl-4-hydroxypiperidine and succinic acid (Tinuvin® 622). Especial preference is given to the condensation product of 1-hydroxyethyl-2,2,6,6-tetramethyl-4-hydroxypiperidine and succinic acid (Tinuvin® 622) when the titanium content of the finished product is less than 150 ppm, preferably less than 50 ppm, in particular less than 10 ppm, based on the employed synthesis components.

HALS compounds are preferably employed in a concentration of 0.01% by weight to 5% by weight, particularly preferably of 0.1% by weight to 1% by weight, in particular of 0.15% by weight to 0.3% by weight, based on the total weight of the thermoplastic polyurethane based on the employed synthesis components.

A particularly preferred UV stabilization comprises a mixture of a phenolic stabilizer, a benzotriazole and a HALS compound in the above-described preferred amounts.

Further details concerning the abovementioned auxiliaries and additives may be found in the technical literature, for example in Plastics Additives Handbook, 5th edition, H. Zweifel, ed., Hanser Publishers, Munich, 2001.

The thermoplastic polyurethanes may be produced discontinuously or continuously by the known processes, for example using reactive extruders or the belt process by the "one-shot" process or the prepolymer process, preferably by the "one-shot" process. In the "one-shot" process, the components (a), (b) to be reacted, and in preferred embodiments also the chain extender in components (b), (c) and/or (d), are mixed with one another consecutively or simultaneously, resulting in immediate onset of the polymerization reaction. In the extruder process, the synthesis components (a), (b), and in preferred embodiments also (c), (d) and/or (e), are introduced into the extruder individually or as a mixture and reacted preferably at temperatures of 100° C. to 280° C., preferably 140° C. to 250° C. The obtained polyurethane is extruded, cooled and pelletized.

In a preferred process, a thermoplastic polyurethane is produced from the synthesis components isocyanate (a), isocyanate-reactive compound (b) including chain extender, and in preferred embodiments the further feedstocks (c) and/or (d) in a first step, and the additives or auxiliaries are incorporated in a second step.

The above-described preparation is preferably used for production as an injection-molded, calendered, powder-sintered or extruded article.

It is preferable to use a twin-screw extruder since the twin-screw extruder is positively conveying, thus allowing more precise adjustment of temperature and output quantity on the extruder.

Processes for producing expanded thermoplastic polyurethane are common knowledge. For instance, the preparation of the expanded thermoplastic polyurethane particles can by impregnation of particles of thermoplastic polyurethane (preferably having a minimum average diameter of 0.2-10 mm) with a blowing agent (it is possible here to use supercritical liquids as blowing agent) under pressure (for example in an autoclave), optionally in suspension at temperatures between 100-200° C., with optional addition of further auxiliaries, followed by subsequent expansion.

Alternatively, the expanded particles can be obtained by melt impregnation of molten thermoplastic polyurethane with a blowing agent and subsequent pelletization.

Corresponding particle foams can be produced by electromagnetic steam welding (for example at temperatures between 100-200° C., optionally under pressure (e.g. 1-6 bar)) or high-frequency electromagnetic radiation, especially microwave radiation or radiowaves.

Suitable processes for producing the foam particles and the resulting particle foams are described, for example, in WO 2005023920, WO 2007082838, WO2010/136398 WO 2013/153190, WO 2013/153190; WO 2014198779, WO2015/055811 WO2017030835, US20170036377, US20160271847, US20160108198, WO2014150119, WO2014150124; WO 16/131671.

In a preferred embodiment, it is a characteristic feature of the hybrid materials of the invention, made from the flexible polyurethane foam of the invention and thermoplastic polyurethane or expanded thermoplastic polyurethane, that at least 50% by weight of the polyol component (b) used to form the flexible polyurethane foam and of the isocyanate-reactive compounds (b) in the thermoplastic polyurethane or expanded thermoplastic polyurethane are identical.

In a further preferred embodiment, it is a characteristic feature of the hybrid materials of the invention, made from the flexible polyurethane foam of the invention and thermoplastic polyurethane, that at least 50% by weight of the isocyanate component a) used to form the flexible polyurethane foam and of the organic isocyanates (a) in the thermoplastic polyurethane or expanded thermoplastic polyurethane are identical.

In a further particularly preferred embodiment, it is a characteristic feature of the hybrid materials of the invention, made from the flexible polyurethane foam of the invention and thermoplastic polyurethane or expanded thermoplastic polyurethane, that at least 50% by weight of the isocyanate component a) used to form the flexible polyurethane foam and of the organic isocyanates (a) in the thermoplastic polyurethane or expanded thermoplastic polyurethane and at least 50% by weight of the isocyanate component a) used to form the flexible polyurethane foam and of the organic isocyanates (a) in the thermoplastic polyurethane or expanded thermoplastic polyurethane are identical.

In a further particularly preferred embodiment, it is a characteristic feature of the hybrid materials of the invention, made from the flexible polyurethane foam of the invention and thermoplastic polyurethane or expanded thermoplastic polyurethane, that at least 85% by weight of the isocyanate component a) used to form the flexible polyurethane foam and of the organic isocyanates (a) in the thermoplastic polyurethane or expanded thermoplastic polyurethane and at least 85% by weight of the isocyanate component a) used to form the flexible polyurethane foam and of the organic isocyanates (a) in the thermoplastic polyurethane or expanded thermoplastic polyurethane are identical.

In a very particularly preferred embodiment, the isocyanate component a) used to form the flexible polyurethane foam or the organic isocyanate (a) in the thermoplastic polyurethane or the expanded thermoplastic polyurethane is selected from the group consisting of diphenylmethane 2,2'-, 2,4'- and/or 4,4'-diisocyanate (MDI), mixtures thereof and/or prepolymers based thereon.

In a very particularly preferred embodiment, the polyol component (b) used to form the flexible polyurethane foam or of the isocyanate-reactive compounds (b) in the thermoplastic polyurethane or the expanded thermoplastic polyurethane is selected from the group of the polyetherdiols, further preferably those based on ethylene oxide, propylene oxide and/or butylene oxide, based on polytetrahydrofuran (PTHF) and polyesterdiols based on adipic acid and mixtures of ethane-1,2-diol and butane-1,4-diol or polyesters based on adipic acid, succinic acid, pentanedioic acid, sebacic acid or mixtures thereof.

In this context, components b) preferably include, as chain extenders, butane-1,4-diol, hexane-1,6-diol and ethanediol.

The present invention further provides a method of recycling a flexible polyurethane foam of the invention or a hybrid material of the invention, comprising collecting, comminuting, cleaning and fusing the hybrid material, preferably in a twin-shaft extruder.

For this purpose, the flexible polyurethane foam of the invention or the hybrid material of the invention is appropriately comminuted.

For example, the extrusion is conducted at temperatures of 120 to 260° C., preferably 160 to 220° C., the pressure being chosen as a function of the machine, material and temperature.

In further embodiments of the aforementioned process, the fusion of the previously comminuted flexible polyurethane foam is conducted together with thermoplastic elastomer, preferably thermoplastic polyurethane, where the fusion is conducted in an extruder.

In this case, the proportion of the thermoplastic elastomer, preferably thermoplastic polyurethane, based on the overall mixture, is preferably more than 30% by weight, preferably more than 50% by weight, most preferably greater than 70% by weight.

In a particularly preferred embodiment, it is a characteristic feature of the added thermoplastic polyurethane that at least 50% by weight of the polyol component (b) used to form the flexible polyurethane foam or of the polyol component (b) and of the isocyanate-reactive compounds (b) in the hybrid material are identical to the isocyanate-reactive compounds (b) in the added thermoplastic polyurethane.

In a particularly preferred embodiment, it is a characteristic feature of the added thermoplastic polyurethane that at least 50% by weight of the isocyanate component a) used to form the flexible polyurethane foam or of the isocyanate component a) used and of the organic isocyanates (a) in the hybrid material are identical to the isocyanate component a) in the added thermoplastic polyurethane.

In a particularly preferred embodiment, it is a characteristic feature of the added thermoplastic polyurethane that
(a) at least 50% by weight of the polyol component (b) used to form the flexible polyurethane foam or of the polyol component (b) and of the isocyanate-reactive compounds (b) in the hybrid material are identical to the isocyanate-reactive compounds (b) in the added thermoplastic polyurethane; and
(b) at least 50% by weight of the isocyanate component a) used to form the flexible polyurethane foam or isocyanate component a) used and of the organic isocyanates (a) in the hybrid material are identical to the isocyanate component a) in the added thermoplastic polyurethane.

In a particularly preferred embodiment, it is a characteristic feature of the added thermoplastic polyurethane that
(a) at least 85% by weight of the polyol component (b) used to form the flexible polyurethane foam or of the polyol component (b) and of the isocyanate-reactive compounds (b) in the hybrid material are identical to the isocyanate-reactive compounds (b) in the added thermoplastic polyurethane; and
(b) at least 85% by weight of the isocyanate component a) used to form the flexible polyurethane foam or isocyanate component a) used and of the organic isocyanates (a) in the hybrid material are identical to the isocyanate component a) in the added thermoplastic polyurethane.

In a very particularly preferred embodiment, the isocyanate component a) used to form the flexible polyurethane foam or the organic isocyanate (a) in the thermoplastic polyurethane is selected from the group consisting of diphenylmethane 2,2'-, 2,4'- and/or 4,4'-diisocyanate (MDI), mixtures thereof and/or prepolymers based thereon.

In a very particularly preferred embodiment, the polyol component (b) used to form the flexible polyurethane foam or the isocyanate-reactive compounds (b) in the thermoplastic polyurethane is selected from the group consisting of
polyetherdiols, further preferably those based ethylene oxide, propylene oxide and/or butylene oxide, based on polytetrahydrofuran (PTHF), and polyesterdiols based on adipic acid and mixtures of ethane-1,2-diol and butane-1,4-diol, or polyesters based on adipic acid, succinic acid, pentanedioic acid, sebacic acid or mixtures thereof. In this context, components b) preferably include, as chain extenders, butane-1,4-diol, hexane-1,6-diol and ethanediol.

In further embodiments of the aforementioned process, the fusion of the previously comminuted hybrid material, preferably comprising thermoplastic polyurethane, is conducted together with thermoplastic elastomer, preferably thermoplastic polyurethane, where the fusion is conducted in an extruder.

In this case, the proportion of the thermoplastic elastomer, preferably thermoplastic polyurethane, based on the overall mixture, is preferably more than 30% by weight, preferably more than 50% by weight, most preferably greater than 70% by weight.

The invention further provides for the use of a flexible polyurethane foam of the invention as described above or of a hybrid material of the invention for consumer articles, preferably selected from the group consisting of items of apparel, especially footwear and footwear parts, especially footwear soles and cushioning; jewelry and jewelry part, especially for a smart device or monitoring electronics, preferably selected from the group consisting of wristband, wristband part, pendant and pendant part, bodybelt and bodybelt part, glasses and glasses part; item of sports equipment; damping material; foam particles; cleaning articles for mobile driving or flying devices; medical articles, especially dressing article, transdermal system, part of a transdermal system, especially plaster, part of a plaster, wound dressing, part of a wound dressing; furniture part; cushions, cushion part; mattresses, mattress part; driving or flying device accessory, especially automotive accessory, especially seat, seat part, carpet backing foam, engine hood, instrument panel, steering wheel; component that absorbs structure-borne and airborne sound; design element for electrical components: and seal, article for the agricultural industry, for hydroculture substrates.

Preference is given to use for an article selected from the group consisting of part of a plaster, part of a wound dressing, cushion, cushion part, mattress, mattress part, automobile seat, automobile seat part and hydroculture substrate.

Particular preference is given to the use of the hybrid material or of the flexible polyurethane foam of the invention for items of apparel, especially shoes, boots, ski boots, and footwear and footwear parts, preference being given to use as footwear and footwear parts, especially as footwear soles and cushioning.

The present invention therefore provides cushioning made of the flexible polyurethane foam of the invention for footwear.

The present invention further provides an insole made of the flexible polyurethane foam of the invention for footwear.

The present invention accordingly also further provides an item of footwear, preferably sports footwear, in which the flexible polyurethane foam of the invention serves as cushioning in, for example, the heel region, forefoot region or in the footwear tongue, and the midsole consists of expanded thermoplastic polyurethane.

The present invention therefore further provides an item of footwear in which the flexible polyurethane foam of the invention serves as cushioning, for example in the heel region, forefoot region or footwear tongue, or is used as an insole, wherein the thermoplastic elastomer, preferably thermoplastic polyurethane, constitutes the treadsole, the upper material and/or further footwear constituents. In this case, the insole may be bonded to the treadsole of thermoplastic elastomer, preferably thermoplastic polyurethane, giving the hybrid material of the invention, or may be inserted into the item of footwear.

The present invention accordingly also further provides an item of footwear, preferably sports footwear, in which the flexible polyurethane foam of the invention serves as cushioning, for example in the heel region, forefoot region or in the footwear tongue, the midsole is made of expanded thermoplastic polyurethane, and the treadsole, the upper material and/or further footwear constituents is/are a thermoplastic elastomer, preferably thermoplastic polyurethane. In this case, the insole may be bonded to the midsole made of expanded thermoplastic polyurethane, giving the hybrid material of the invention, or may be inserted into the item of footwear.

The recycled hybrid material can preferably for injection molding applications such as underlays, dampers, stops, footwear soles, footwear parts, rail pads, mats, animal earmarks.

Illustrative embodiments of the present invention are detailed hereinafter, but these do not restrict the present invention. More particularly, the present invention also encompasses those embodiments that result from the dependency references and hence combinations that are specified hereinafter.

1. A process for producing a thermally recyclable flexible polyurethane foam having a free density between 30 and 150 g/L the conversion of a reaction mixture comprising
   a. an isocyanate component having a functionality between 1.9-2.2;
   b. a polyol component having a functionality between 1.7-2.2;
   c. at least one blowing agent; and
   d. a catalyst.
2. The process according to embodiment 1, wherein the polyol component (b) is a polyester- or polyetherpolyol having an average molecular weight of 500 g/mol and 12 000 g/mol.
3. The process according to embodiment 1 or 2, wherein the polyol component (b) additionally comprises a chain extender.
4. The process according to any of embodiments 1 to 3, wherein the flexible polyurethane foam has a softening point of less than 150° C.
5. A thermally recyclable flexible polyurethane foam obtainable by a process according to any of embodiments 1 to 4.
6. A hybrid material comprising the flexible polyurethane foam of the invention according to embodiment 5 and compact thermoplastic elastomer.
7. The hybrid material according to embodiment 6, comprising the flexible polyurethane foam of the invention according to embodiment 5 and expanded thermoplastic polyurethane.
8. The hybrid material according to embodiment 6 or 7, wherein at least 50% by weight of the polyol component (b) used to form the flexible polyurethane foam and of the isocyanate-reactive compounds (b) in the thermoplastic polyurethane are identical.
9. The hybrid material according to any of embodiments 6 to 8, in which at least 50% by weight of the isocyanate component a) used to form the flexible polyurethane foam and of the organic isocyanates (a) in the thermoplastic polyurethane are identical.
10. A method of recycling a flexible polyurethane foam according to embodiment 5 by fusion.
11. The method according to embodiment 10 by fusing the flexible polyurethane foam according to embodiment 5 together with thermoplastic elastomer.
12. The method according to embodiment 10 or 11 by fusing the flexible polyurethane foam according to embodiment 5 together with thermoplastic polyurethane.
13. A method of recycling a hybrid material according to any of embodiments 6 to 8 by fusion.
14. The method according to any of embodiments 10 to 13, which is conducted in an extruder.
15. The use of a flexible polyurethane foam according to embodiment 5 or of the hybrid material of the invention according to any of embodiments 6 to 8 for items of apparel, jewelry and jewelry parts, items of sports equipment, damping material, foam particles, cleaning articles for mobile driving or flying devices, medical articles; furniture parts; cushions, cushion part; mattresses, mattress part; driving or flying device accessories; component that absorbs structure-borne and airborne sound; design element for electrical components and seals, and articles for the agricultural industry and hydroculture substrates.
16. The use of a flexible polyurethane foam according to embodiment 5 or of the hybrid material of the invention according to any of embodiments 6 to 9 for items of apparel, jewelry and jewelry parts, items of sports equipment, damping material, foam particles, cleaning articles for mobile driving or flying devices, medical articles; furniture parts; cushions, cushion part; mattresses, mattress part; driving or flying device accessories; component that absorbs structure-borne and airborne sound; design element for electrical components and seals, and articles for the agricultural industry and hydroculture substrates.
17. The use of a flexible polyurethane foam according to embodiment 5 or of the hybrid material of the invention according to any of embodiments 6 to 8 for footwear.
18. The use of a flexible polyurethane foam according to embodiment 5 as cushioning in the heel region, forefoot region or in the footwear tongue or as insole.
19. A cushioning element made of flexible polyurethane foam according to embodiment 5 for the heel region, the forefoot region or in the footwear tongue.
20. An insole for footwear, made of flexible polyurethane foam according to embodiment 5.
21. An item of footwear comprising a flexible polyurethane foam according to embodiment 5 as cushioning in the heel region, forefoot region or in the footwear tongue or as insole.
22. An item of footwear comprising a flexible polyurethane foam according to embodiment 5 as cushioning in the heel region and/or forefoot region and/or in the footwear tongue and/or as insole and a midsole made of expanded thermoplastic polyurethane and/or the treadsole, the upper material and/or further footwear parts made of thermoplastic polyurethane.

The examples which follow serve to illustrate the invention, but are in no way restrictive with respect to the subject matter of the present invention.

EXAMPLES

1. Feedstocks of polymeric MDI (pMDI), and polyols and chain extenders/crosslinkers having functionalities of 3 or greater. A commercially available seat foam system based on polyhydric polyetherpolyols and pMDI for the vehicle and furniture sector was chosen here as reference system, obtainable as Elastoflex® W 5165/142 from BASF SE.

| | | Nominal functionality |
|---|---|---|
| Polyol 1: | Polyesterdiol having a hydroxyl number of 56 mg KOH/g formed from adipic acid, ethylene glycol and butane-1,4-diol | 2 |
| Polyol 2: | A propylene glycol-started polyoxypropylene-polyoxyethylene having a polyoxyethylene content of 18% by weight based on the alkylene oxide content, a hydroxyl number of 29 mg KOH/g and predominantly primary hydroxyl groups. | 2 |
| Polyol 3: | Polyesterdiol having a hydroxyl number of 38 mg KOH/g formed from adipic acid, butane-1,4-diol and propane-1,2-diol | 2 |
| Polyol 4: | A 3-(dimethylamino)propylamine-started polyoxypropylene having a polyoxypropylene content of 77% by weight and a hydroxyl number of 250 mg KOH/g | 2 |
| Polyol 5: | A propylene glycol-started polyoxypropylene having a polyoxypropylene content of 98% by weight and a hydroxyl number of 28 mg KOH/g | 2 |
| Polyol 6: | A diethylene glycol-started polyoxypropylene-polyoxyethylene having a polyoxyethylene content of 74% by weight based on the alkylene oxide content, a hydroxyl number of 51 mg KOH/g and predominantly primary hydroxyl groups. | 2 |
| BA: | Water as blowing agent | |
| CE 1: | Butane-1,4-diol as chain extender from BASF SE | 2 |
| CE 2: | Ethylene glycol from BASF SE | 2 |
| Cat 1: | Lupragen® N203 amine catalyst from BASF SE | |
| Cat 2: | KX 611 amine catalyst from BASF Polyurethanes GmbH | |
| Cat 3: | Lupragen® N201 amine catalyst from BASF SE | |
| Stab 1: | Dabco® DC 193 silicone-based stabilizer from Air Products GmbH | |
| Iso 1: | 55 parts by weight of 4,4'-MDI, 1 part by weight of 2,4'-MDI, 6 parts by weight of carbodiimide-modified 4,4'-MDI and 37 parts by weight of a polyesterdiol having a hydroxyl number of 56 mg KOH/g, formed from adipic acid, ethylene glycol and butane-1,4-diol, were converted to the isocyanate prepolymer. The NCO content was 19%. | 2 |
| Iso 2: | 85.7 parts by weight of 4,4'-MDI, 1.2 parts by weight of 2,4'-MDI, 4.9 parts by weight of a propylene glycol-started polyoxypropylene having a polyoxypropylene content of 83% by weight and a hydroxyl number of 248 mg KOH/g, and 8.2 parts by weight of dipropylene glycol were converted to the isocyanate prepolymer. The NCO content was 23%. | 2 |
| Iso 3: | Mixture of 90 parts Iso1 and 10 parts Iso 2. The NCO content was 19.2%. | 2 |
| Iso 4: | A mixture comprising 49 parts by weight of 4,4'-MDI, 48.6 parts by weight of 2,4'-MDI and 2.4 parts by weight of 2,2'-MDI. The NCO content was 33.5%. | 2 |
| System 1 (V1): | Elastoflex® W 5165/142 - commercially available seat foam system for the motor vehicle and furniture sector based on different glycerol-started polyoxypropylene-polyoxyethylenes having a functionality of 3, a trifunctional chain extender, and an isocyanate component having a proportion of polymeric MDI of 40 parts. | |

2. Production of the Foam Test Specimens

According to the tables which follow, the feedstocks for the polyol component were mixed with a Vollrath stirrer at 1800 revolutions per minute for 10 min. The isocyanate component was processed at 30° C. On account of viscosity, polyetherpolyols were processed at 25° C. and polyester components at 45° C. Polyol component and polyisocyanate component were then mixed with a Vollrath stirrer at 1800 revolutions per minute for 10 seconds and introduced into a mold. All amounts in the tables which follow for the starting substances are parts by weight (% by weight).

In addition, a standard, commercially available flexible foam system was included as reference system. A conventional flexible foam system typically consists of a polyol component with feedstocks (polyols and chain extenders/crosslinkers) with functionalities >2. The isocyanate component, often a prepolymer, typically comprises a proportion The flexible foam test specimens obtained were conditioned under standard climatic conditions for 2 days prior to mechanical characterization. Test specimens were cut or die-cut out of these samples, and tear propagation resistance was determined to DIN ISO 34-1A, as were tensile strength and elongation at break to DIN 53543. Abrasion at 10 N was determined to DIN ISO 4649, and the density of foams by Method A of DIN EN ISO 1183-1.

The melting point was determined with the aid of a heated press at a defined contact pressure over a defined time [sec]. For this purpose, foam cubes with an edge length of 5 cm were prepared. For this purpose, the desired temperatures were established in the upper and lower plates of the heated press and the system was equilibrated for about half an hour. The foam cube was positioned between the upper and lower plates of the heating press, at first without deforming the test specimen. The plates of the heated press were then brought together with the desired contact pressure, determining the time by means of a stopwatch. After the dwell time had expired, the upper and lower plates of the heated press were moved apart again, and the test specimen was removed and assessed.

The compositions and the results of the measurements are given in tables 1-3.

TABLE 1

Composition of the formulations (polyester/polyether-based).

|  | V1 System 1 | B1 | B2 | B3 | B4 | B5 |
|---|---|---|---|---|---|---|
| Polyol 1 |  | 85.00 | 85.00 | 42.00 | 85.00 | 59.50 |
| Polyol 2 |  | 4.50 | 4.50 | 4.50 | 4.50 | 30.00 |
| Polyol 3 |  | — | — | 43.00 | — | — |
| CE1 |  | 3.00 | 3.00 | 3.00 | 3.00 | 3.00 |
| CE2 |  | 3.38 | 3.38 | 3.38 | 3.38 | 3.38 |
| Cat 1 |  | 2.10 | — | 2.10 | 2.10 | 2.10 |
| Cat 2 |  | — | 2.00 | — | — | — |
| Stab 1 |  | 0.08 | 0.08 | 0.08 | 0.08 | 0.08 |
| BA |  | 2.50 | 2.50 | 2.50 | 2.50 | 2.50 |
| Iso 1 |  | X | X | X | — | X |
| Iso 3 |  | — | — | — | X | — |
| Index |  | 80 | 95 | 95 | 80 | 80 | 80 |
| Free density [g/L] | 50 | 83 | 85 | 63 | 60 | 75 |

TABLE 1-continued

Composition of the formulations (polyester/polyether-based).

|  | V1 System 1 | B1 | B2 | B3 | B4 | B5 |
|---|---|---|---|---|---|---|
| Melting point [° C.] at contact pressure [kN] for time [sec] | No melting point, carbonized | n.d. | n.d. | 140° C. at 50 kN for 180 sec | n.d. | n.d. |

V: comparative example
B: inventive example
n.d.: not determined

TABLE 2

Index variations (polyester/polyether-based).

|  | B6 | B7 | B8 |
|---|---|---|---|
| Polyol 1 | 85.00 | 85.00 | 85.00 |
| Polyol 2 | 4.50 | 4.50 | 4.50 |
| CE1 | 3.00 | 3.00 | 3.00 |
| CE2 | 3.38 | 3.38 | 3.38 |
| Cat 1 | 2.10 | 2.10 | 2.10 |
| Stab 1 | 0.08 | 0.08 | 0.08 |
| BA | 2.50 | 2.50 | 2.50 |
| Iso 1 | X | X | X |
| Index | 60 | 80 | 120 |
| Free density [g/L] | 80 | 64 | 81 |
| Melting point [° C.] at contact pressure [kN] for time [sec] | 140° C. at 25 kN for 60 sec | 140° C. at 50 kN for 180 sec | 140° C. at 50 kN for 180 sec |

B: Inventive Example

TABLE 3

Composition of the formulations and index variations. (polyetherol-based)

|  | B9 | B10 | B11 | B12 | B13 | B14 |
|---|---|---|---|---|---|---|
| Polyol 2 | 97.00 | 97.00 | 97.00 | 97.00 | 97.00 | 97.00 |
| Cat 3 | 0.80 | 0.80 | 0.80 | 0.80 | 0.80 | 0.80 |
| BA | 3.00 | 3.00 | 3.00 | 3.00 | 3.00 | 3.00 |
| Iso 4 | X | X | X | X | X | X |
| Index | 70 | 80 | 90 | 95 | 100 | 105 |
| Free density [g/L] | 37 | 35 | 35 | 36 | 37 | 38.1 |
| Melting point [° C.] at contact pressure 25 kN for 60 sec. | 140° C. at 25 kN for 60 sec | 140° C. at 25 kN for 60 sec | 140° C. at 25 kN for 60 sec | 140° C. at 25 kN for 60 sec | 140° C. at 25 kN for 60 sec | 140° C. at 50 kN for 180 sec |

|  | B15 | B16 | B17 | B18 |
|---|---|---|---|---|
| Polyol 2 | 87.00 | 92.00 | 92.00 | 87.00 |
| Polyol 4 | 10.00 | — | — | — |
| Polyol 5 | — | 5.00 | — | — |
| Polyol 6 | — | — | 5.00 | 10.00 |
| Cat 3 | 0.60 | 0.80 | 0.80 | 0.80 |
| BA | 3.00 | 3.00 | 3.00 | 3.00 |
| Iso 4 | X | X | X | X |
| Index | 95 | 95 | 95 | 95 |
| Free density [g/L] | — | — | — | — |
| Melting point [° C.] at contact pressure 25 kN for 60 sec. | 140° C. at 25 kN for 60 sec | 140° C. at 25 kN for 60 sec | 140° C. at 25 kN for 60 sec | 140° C. at 25 kN for 60 sec |

V: comparative example
B: inventive example

3. Compaction of the Foam Test Specimens

The foam test specimens produced as described above were compacted with the aid of a heated press. For this purpose, a foam body of dimensions 5×10×5 cm was placed between the Teflon-coated metal plates of the press that were at 180° C., and the metal plates were moved together until a pressure of 25-30 kN had been attained. After about 5-7 minutes, the pressure was constant, and so the metal plates were moved apart and the compacted test specimen was removed.

The compositions and the results of the measurements are given in table 4.

TABLE 4

Mechanical data for the compaction of the foam.

|  | V1 System 1 | B3 | B4 | B12 |
|---|---|---|---|---|
| Shore hardness [A] | 55 | 78 | 80 | 81 |
| Tensile strength [MPa] | 3 | 7 | 5 | 6 |
| Elongation at break [%] | 80 | 370 | 210 | 250 |
| Tear propagation resistance [kN/m] | 5 | 36 | 39 | n.d. |
| Density [g/cm$^3$] | 0.9 | 1.1 | 1.1 | 1.1 |

V: comparative example
B: inventive example
n.d.: not determined

The results show that flexible foams of linear construction show better mechanical properties after compaction than the conventional flexible foam V1. Thus, the foams of the invention can subsequently be used to produce compact or foamed bodies with a (partial) compact layer with advantageous mechanical properties.

4. Preparation of the Thermoplastic Polyurethane 4.a—Preparation of Thermoplastic Polyurethane ("Thermoplastic Polyurethane 1")

371.4 g of Polyol 4 and 140.4 g of CE 1 were weighed out in a 2 L tinplate bucket and heated up to 80° C. Subsequently, while stirring at 220 rpm, 10 g of AO and 0.5 g of GL were added. After a stirring step for 2 min for homogenization, 482.8 g of Iso 4 were added to the solution and the mixture was stirred (45 s) until the solution had reached a temperature of 110° C. The reaction mixture was then poured into a flat dish and kept at 125° C. on a hot plate for 10 min. Thereafter, the slab formed was subjected to heat treatment in a heated cabinet at 100° C. for 24 h.

4.a—Preparation of Thermoplastic Polyurethane ("Thermoplastic Polyurethane 2")

560.1 g of Polyol 4 and 76.6 g of CE 1 were weighed out in a 2 L tinplate bucket and heated up to 80° C. Subsequently, while stirring at 220 rpm, 10 g of AO and 0.5 g of GL were added. After a stirring step for 2 min for homogenization, 352.8 g of Iso 4 were added to the solution and the mixture was stirred (45 s) until the solution had reached a temperature of 110° C. The reaction mixture was then poured into a flat dish and kept at 125° C. on a hot plate for 10 min. Thereafter, the slab formed was subjected to heat treatment in a heated cabinet at 100° C. for 24 h.

5. Recycling of the foam test specimens by coextrusion with thermoplastic polyurethane The foam test specimens were sawn into small cubes and compressed at about 50 kN with a heated press at 160° C. for one minute. The compacts obtained were then ground with a 5 mm sieve and the foam pellets were then dried in a heated cabinet at 110° C. for 3 hours.

The above-described thermoplastic polyurethane samples were comminuted in a mill to give pourable pellets, dried again in a heating cabinet at 110° C. for 3 hours and filled into aluminum-coated PE bags for further use. In the next step, the foam pellets were mixed in different proportions with a mixture of thermoplastic polyurethane 1 and thermoplastic polyurethane 2 in a ratio of 1:1. The mixture of thermoplastically recyclable foam and the thermoplastic polyurethane was extruded in an APV twin-screw extruder that gives a strand diameter of about 2 mm. The following parameters were set:

| Extruder: | Corotating APV MP19 twin-screw extruder |
|---|---|
| Screw diameter | 19 mm |
| Temperature profile: | HZ1 (intake) about 225° C. |
|  | HZ2 about 225° C. |
|  | HZ3 about 220° C. |
|  | HZ4 about 215° C. |
|  | HZ5 (nozzle) about 215° C. |
| Screw speed: | 100 rpm |
| Pressure: | about 10 to 30 bar |
| Extrudate cooling: | water bath (10° C.) |

The strands were pelletized, dried and processed by means of injection molding to give injection-molded sheets of thickness 2 and 6 mm, on which the mechanical properties according to tables 5 and 6 were determined.

TABLE 5

Mechanical characterization of the injection-molded sheets from the coextrusion of thermoplastic polyurethane 1 and thermoplastic polyurethane 2 in a ratio of 1:1 with flexible foam B2.

|  | V2 | E1 | E2 | E3 | E4 |
|---|---|---|---|---|---|
| Foam from B2 [% by wt.] | 0 | 5 | 10 | 20 | 25 |
| Shore hardness [A] | 94 | 94 | 93 | 92 | 91 |
| Shore hardness [D] | 52 | 46 | 44 | 42 | 40 |
| Tensile strength [MPa] | 43 | 33 | 25 | 15 | 15 |
| Elongation at break [%] | 510 | 530 | 530 | 440 | 460 |
| Tear propagation resistance [kN/m] | 112 | 102 | 84 | 57 | 53 |
| Abrasion [mm$^3$] | 52 | 106 | 168 | 225 | 249 |
| Density [g/cm$^3$] | 1.1 | 1.1 | 1.2 | 1.2 | 1.2 |
| Appearance of the test sheet | transparent | transparent, yellowish | translucent, yellowish | opaque, yellowish | opaque, yellowish |

V: comparative example
E: inventive example

TABLE 6

Mechanical characterization of the injection-molded sheets from the coextrusion of thermoplastic polyurethane 1 and thermoplastic polyurethane 2 in a ratio of 1:1 with flexible foam B12.

| | E5) | E6 | E7 |
|---|---|---|---|
| Foam from B12 [% by wt.] | 5 | 10 | 20 |
| Shore hardness [A] | 94 | 93 | 92 |
| Shore hardness [D] | 48 | 43 | 40 |
| Tensile strength [MPa] | 48 | 44 | 36 |
| Elongation at break [%] | 530 | 560 | 580 |
| Tear propagation resistance [kN/m] | 108 | 98 | 78 |
| Abrasion [mm$^3$] | 53 | 60 | 84 |
| Density [g/cm$^3$] | 1.1 | 1.1 | 1.1 |
| Appearance of the test sheet | translucent, yellowish | opaque, yellowish | opaque, yellowish |

V: comparative example
E: inventive example

TABLE 7

Mechanical characterization of the injection-molded sheets from the coextrusion of thermoplastic polyurethane 1 and thermoplastic polyurethane 2 in a ratio of 1:1 with System 1 (V1).

| | V3 | V4 |
|---|---|---|
| Foam from V1 [% by wt.] | 5 | 20 |
| Shore hardness [A] | 93 | 91 |
| Shore hardness [D] | 43 | 38 |
| Tensile strength [MPa] | 32 | 16 |
| Elongation at break [%] | 520 | 410 |
| Tear propagation resistance [kN/m] | 83 | 58 |
| Abrasion [mm$^3$] | 105 | 162 |
| Density [g/cm$^3$] | 1.1 | 1.1 |
| Appearance of the test sheet | yellowish, opaque, rough surface | yellowish, opaque, rough surface |

V: comparative example

The results show that the inventive flexible polyurethane foams have good thermal recyclability with a proportion of added thermoplastic polyurethane. The sheets obtained are surprisingly homogeneous and have a smooth surface. By contrast, a conventional crosslinked flexible foam, such as V1, can be incorporated only in small amounts (i.e. max. 20%); in addition, the sheets resulting therefrom were inhomogeneous and rough even at low concentrations of V1.

LITERATURE CITED

DE 19916543B4
U.S. Pat. No. 3,935,132
WO 2012/065291 A1
U.S. Pat. No. 4,904,706
DE 19514744 C2
"Kunststoffhandbuch, Band 7, Polyurethane", Carl Hanser Verlag, 3rd edition 1993, chapter 3.1.
U.S. Pat. No. 3,304,273 A
U.S. Pat. No. 3,383,351 A
U.S. Pat. No. 3,523,093 A
DE 1 152 536 A
DE 1 152 537
Kunststoffhandbuch, Band 7, Carl Hanser Verlag, Munich 1966 (S. 103-113)
Kunststoffhandbuch, Band 7, Polyurethane, edited by Günter Oertel, Carl-Hanser-Verlag, Munich, 3rd edition 1993, chapter 5,
"Polymer Chemistry", Interscience Publ., New York, 1961, p. 111-127;
Kunststoffhandbuch, Band VIII, C. Hanser Verlag, Munich 1973
Journal of Polymer Science, Part A1, 4, pages 1851-1859 (1966)
Plastics Additives Handbook, 5th Edition, H. Zweifel, ed., Hanser Publishers, Munich, 2001 ([1]), p. 98-p. 136
WO 2005023920
WO 2007082838
WO2010/136398
WO 2013/153190
WO 2013/153190
WO 2014198779
WO2015/055811
WO2017030835
US20170036377
US20160271847
US20160108198
WO2014150119
WO2014150124
WO 16/131671

The invention claimed is:

1. A process for producing a thermally recyclable flexible polyurethane foam having a free density between 30 and 150 g/L, the process comprising reacting a mixture comprising:
   a. an isocyanate component having a functionality between 1.9 and 2.2;
   b. a polyol component having a functionality between 1.7 and 2.2;
   c. a blowing agent; and
   d a catalyst,
   wherein the polyol component (b) comprises a chain extender, and
   wherein the thermally recyclable flexible polyurethane foam has a softening point of less than 150° C.

2. The process of claim 1, wherein the polyol component (h) is a polyester- or polyetherpolyol having an average molecular weight between 500 g/mol and 12 000 g/mol.

3. A thermally recyclable flexible polyurethane foam obtainable by the process of claim 1.

4. A hybrid material comprising the thermally recyclable flexible polyurethane foam of claim 3 and a compact thermoplastic elastomer.

5. A hybrid material comprising the thermally recyclable flexible polyurethane foam of claim 3 and a compact thermoplastic polyurethane.

6. The hybrid material of claim 4, further comprising an expanded thermoplastic polyurethane.

7. The hybrid material of claim 5, wherein at least 50% by weight of the polyol component (b) used to form the thermally recyclable flexible polyurethane foam and of isocyanate-reactive compounds in the thermoplastic polyurethane and at least 50% by weight of the isocyanate component (a) used to form the thermally recyclable flexible polyurethane foam and of organic isocyanates in the thermoplastic polyurethane are identical.

8. A method of recycling the thermally recyclable flexible polyurethane foam of claim 3, the method comprising performing fusion of the thermally recyclable flexible polyurethane foam.

9. A method of recycling the hybrid material of claim 4, the method comprising performing fusion of the hybrid material.

10. A method of producing an item of apparel, jewelry, a jewelry part, an item of sports equipment, a damping material, foam particles, a cleaning article for mobile driving or flying devices, a medical article, a furniture part, a cushion, a cushion part, a mattress, a mattress part, a driving or flying device accessory, a component that absorbs structure-borne and airborne sound, a design element for electrical components and seals, or an article for the agricultural industry and hydroculture substrates, the method comprising obtaining the thermally recyclable flexible polyurethane foam of claim 3.

11. A method of producing footwear, the method comprising obtaining the thermally recyclable flexible polyurethane foam of claim 3.

12. A cushioning element comprising the thermally recyclable flexible polyurethane foam of claim 3 in a heel region, a forefoot region or in a footwear tongue.

13. An insole for footwear, comprising recyclable flexible polyurethane foam of claim 3.

14. An item of footwear comprising the thermally recyclable flexible polyurethane foam of claim 3 as cushioning in a heel region, forefoot region or in a footwear tongue or as insole.

15. An item of footwear comprising the thermally recyclable flexible polyurethane foam of claim 3 as cushioning in a heel region, forefoot region or in a footwear tongue or as insole and a midsole comprising expanded thermoplastic polyurethane and/or a treadsole, an upper material and/or further footwear part comprising thermoplastic polyurethane.

16. The process of claim 3, wherein the thermally recyclable flexible polyurethane foam has a free density of 30 to 85 g/L.

17. The process of claim 1, wherein the thermally recyclable flexible polyurethane foam has a free density of 30 to 85 g/L.

18. The process of claim 1, wherein the polyol component (b) is a polyester- or polyetherpolyol having an average molecular weight between 1000 g/mol and 6000 g/mol.

19. The process of claim 1, wherein the thermally recyclable flexible polyurethane foam is an open-cell foam.

20. The process of claim 1, wherein all of the isocyanate components used have a functionality between 1.9 and 2.2 and all of the polyol components used have a functionality between 1.7 and 2.2.

\* \* \* \* \*